United States Patent [19]

Pyun

[11] Patent Number: 4,932,124
[45] Date of Patent: Jun. 12, 1990

[54] TOOL FOR CUTTING AND STRIPPING ARMORED ELECTRIC CABLES

[76] Inventor: Tai Young Pyun, 2101 Coleridge Dr., Silver Spring, Md. 20910

[21] Appl. No.: 357,165

[22] Filed: May 25, 1989

[51] Int. Cl.$^5$ ............................................. B21F 13/00
[52] U.S. Cl. ........................................ 30/902; 7/107; 81/9.44; 81/9.4; 30/90.1
[58] Field of Search ................. 30/90.1, 90.4, 90.8, 30/90.2; 7/107; 81/9.44, 9.4, 9.43

[56] References Cited

U.S. PATENT DOCUMENTS

| | | |
|---|---|---|
| 669,556 | 3/1901 | Spring . |
| 786,454 | 4/1905 | Montgomery et al. . |
| 2,031,470 | 3/1934 | Eck et al. . |
| 2,400,177 | 7/1943 | Tomsick . |
| 2,493,941 | 11/1948 | Belden . |
| 2,551,401 | 5/1951 | Underhill . |
| 2,591,560 | 4/1952 | Lavoie . |
| 2,902,759 | 9/1959 | Miller . |
| 3,107,424 | 10/1963 | Stackawicz . |
| 3,447,172 | 6/1969 | Clark . |
| 3,483,617 | 12/1969 | Krampe . |
| 3,624,901 | 12/1971 | Pettit et al. . |
| 3,902,206 | 9/1975 | Naquin . |
| 4,081,871 | 4/1978 | Knuth ................................. 7/107 |
| 4,081,903 | 4/1978 | Cormier . |
| 4,142,290 | 3/1979 | Ducret . |

Primary Examiner—Frank T. Yost
Assistant Examiner—Willmon Fridie, Jr.

[57] ABSTRACT

A tool for use on armored cables which includes a pair of gripping jaws for tightly gripping the armored cable, a cutting edge for vertically cutting in a straight manner a metal sheath of the armored cable, a plurality of stripping members for readily stripping the wire insulation within the armored cable, a pair of blades for easily cutting the electric wire of the armored cable, and a jaw adjustable member for adjusting the gripping jaws so as to provide for treatment of any size armored cable, whereby the tool has multiple functions, such as a metal sheath cutting, insulation stripping, and electric wire cutting functions for convenient use to treat armored cables.

9 Claims, 2 Drawing Sheets

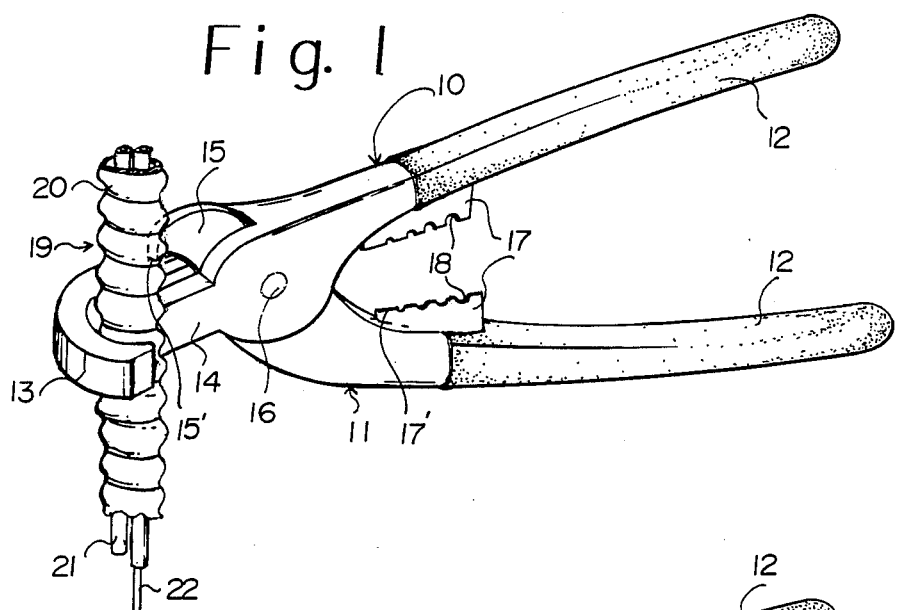
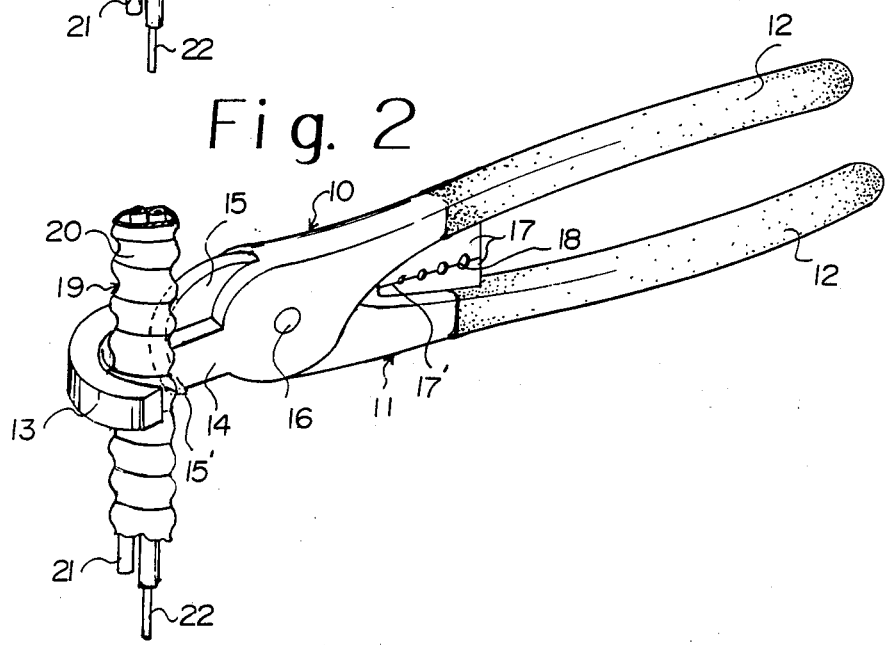
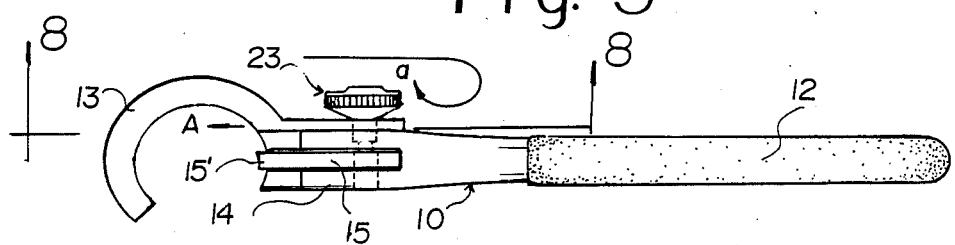

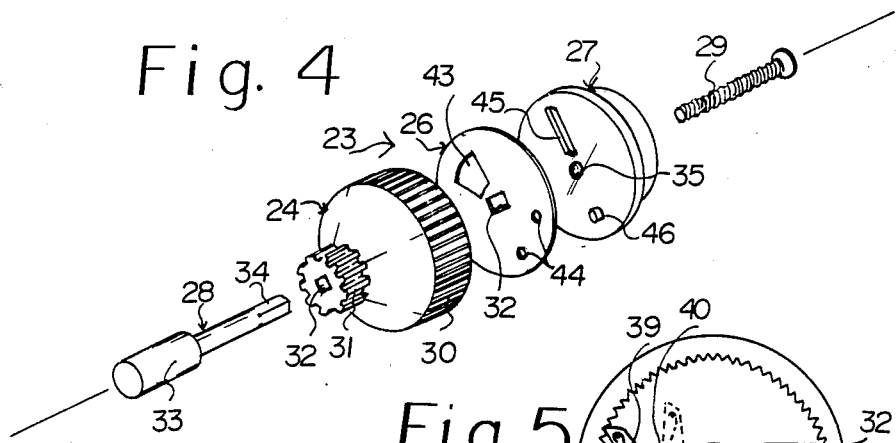
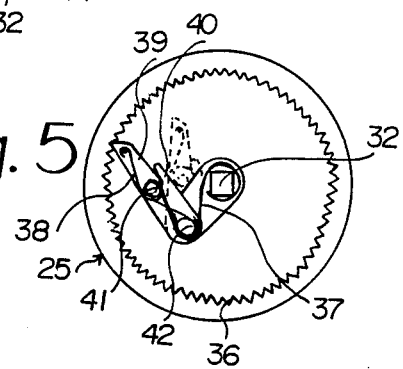
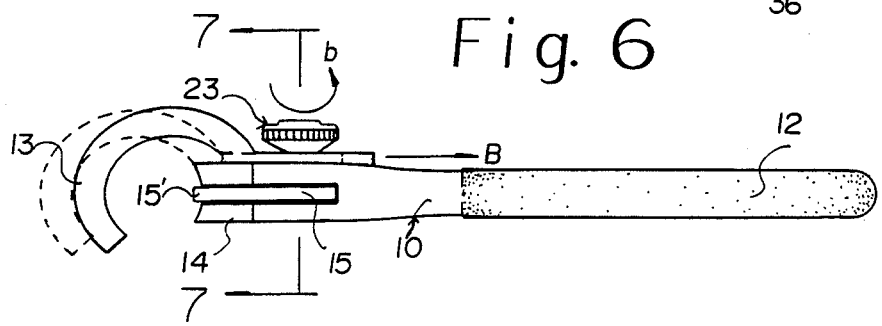
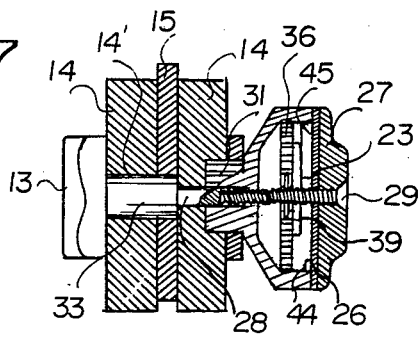
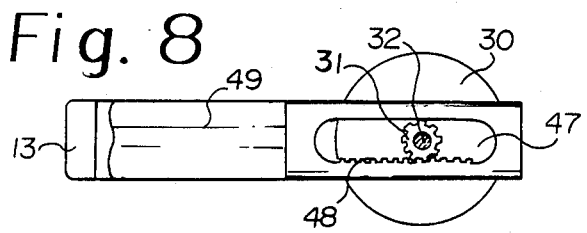

TOOL FOR CUTTING AND STRIPPING ARMORED ELECTRIC CABLES

BACKGROUND OF THE INVENTION

1. Field of the Invention

The present invention relates to a tool for cutting and stripping armored electric cables and more particularly, to a tool having adjustable jaws for cutting the metal sheath of an armored cable such as a metal sheath of BX cable, BX sheath, or the like, stripping the insulation off the cable after removing the armor, and cutting the electric wire of the cable after removing the insulation, whereby the tool has multiple functions such as metal sheath cutting, insulation stripping, and electric wire cutting functions, and the tool may be conveniently carried in a tool pouch, and adjusted for treating any size armored cable.

2. Description of the Prior Art

BX cable as is well known, is an armored cable, and includes one or more insulated wires within a metal sheath. The sheath is formed by a helically wound metal strip having one edge of the convolutions thereof overlapping and interlocking with the underlying edge of adjacent convolutions. The BX sheath alone may be used as a conduit in wiring installations, and when in place, wire may be threaded therethrough.

The metal strip forming the BX sheath or conduit is of a relatively hard steel. The cross section of the strip is generally in the shape of an S for interlocking purposes, and when arranged as a helix, it is extremely difficult to cut.

Tools in the form of hack-saws or cutting pliers are well known for cutting BX sheath but these have not been altogether satisfactory. Such tools require considerable physical effort and time in cutting, the ends of the separated sheath sections cut thereby are ragged and sharp, and there is a likelihood of cutting or impairing the wires therein in the cutting operation.

Furthermore, such tools have only a cutting function, and there is the requirement of the use of many independent tools for stripping the insulation skin or cutting the electric wire of the armored electric cable. Such conventional tools for use in armored cable are shown in U.S. Pat. No. 669,556 to Spring, U.S. Pat. No. 786,454 to Montgomery et al, U.S. Pat. No. 2,031,470 to Eck et al, U.S. Pat. No. 2,400,177 to Tomsick, U.S. Pat. No. 2,493,941 to Belden, U.S. Pat. No. 2,551,401 to Underhill, U.S. Pat. No. 2,591,560 to Lavoie, U.S. Pat. No. 2,902,759 to Miller, U.S. Pat. No. 3,107,424 to Stackawicz, U.S. Pat. No. 3,447,172 to Clark, U.S. Pat. No. 3,483,617 to Krampe, U.S. Pat. No. 3,624,901 to Pettit et al, U.S. Pat. No. 3,902,206 to Naquin, U.S. Pat. No. 4,081,903 to Cormier, and U.S. Pat. No. 4,142,290 to Ducret.

SUMMARY OF THE INVENTION

Accordingly, it is an object of the present invention to provide a tool having multiple functions such as metal sheath cutting, insulation stripping, and electric wire cutting functions for readily handling armored electric cables.

Another object of the present invention is to provide a tool having adjustable jaws for cutting and stripping armored electric cables of any size.

A further object of the present invention is to provide a tool for cutting and stripping armored electric cables which is simple in construction, compact for portability, inexpensive to manufacture, durable in use, and refined in appearance.

Still another object of the present invention is to provide a tool which includes a pair of gripping jaws wherein one of them has a plurality of traction screws disposed in the inner surface thereof for tightly gripping the armored electric cables to effectively cut it.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a tool for use in armored cables which includes a pair of gripping jaws for tightly gripping armored cables, a cutting edge for vertically cutting in a straight manner the metal sheath of armored cables, a plurality of stripping members for readily stripping the insulation of armored cables, a pair of blades for easily cutting the electric wire of armored cables, and an adjustable jaw member for adjusting one of the pair of gripping jaws so as to allow for the treatment of any size armored cable, whereby the tool has multiple functions such as metal sheath cutting, insulation stripping, and electric wire cutting functions for convenient use to treat armored cables.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of a tool for use in armored electric cables according to the present invention showing a piece of cable therein in its fully open position;

FIG. 2 is a perspective view of the tool for use in the armored electric cables in its fully closed position;

FIG. 3 is a top plan view of FIG. 1, except for the removal of the cable therefrom;

FIG. 4 is an exploded perspective view of a jaw adjusting member of the tool according to the present invention;

FIG. 5 is a front elevational view of a locking member of the jaw adapting member according to the present invention;

FIG. 6 is a top plan view of FIG. 2, except for the removal of the cable therefrom;

FIG. 7 is a cross-sectional view of FIG. 6, taken along line 7—7; and

FIG. 8 is a sectional view of FIG. 3, taken alone line 8—8.

DESCRIPTION OF THE PREFERRED EMBODIMENTS

Referring now in detail to the drawings for the purpose of illustrating preferred embodiments of the present invention, a tool for cutting and stripping armored electric cable as shown in FIGS. 1, 2, and 3 comprises a gripping body 10 having a C-shaped jaw 13 and a raised jaw 14 disposed at one end thereof, a cutting body 11 having a cutting edge 15 with a cutting point 15′ disposed at one end thereof for vertically cutting a metal sheath 20 of armored electric cable 19 and pivotably connected to the gripping body through a pivot pin 16, a jaw-adjusting member 23 for longitudinally moving the C-shaped jaw 13 so as to tightly grip any size armored electric cable 19 therein and a stripping and cutting member for stripping an insulation skin 21 and cutting an electric wire 22.

The gripping body 10 further includes a handle 12 disposed at the other end thereof for mating with a handle 12 disposed at the other end of the cutting body 11 so as to squeeze the tool. Also the gripping body 10 and the cutting body 11 include a stripping and cutting body 17 disposed at the inside of the middle portions thereof, respectively. Each stripping and cutting body 17 contains a blade 17' and a complementary recess 18 for mating with each other so as to strip insulation skin 21 from the armored electric cable 19 and cutting the electric wire 22 of the armored electric cable 19 (FIGS. 1 and 2).

As shown in FIGS. 3 and 7, the jaw-adjusting member 23 includes a handle body 24 having a conical hollow configuration, a toothed wheel 31 with a square aperture 32 and a threaded surface for easily rotating the handle body 24, a rod 28 engaged with the square aperture 32 through a hollow square end 34, a circular locking member 25 engaged within the hollow side of the handle body 24, a circular plate 26, a circular cover 27, and a screw 29 for aligning these in a line by insertion thereof into a hollow portion of the hollow square end 34 of the rod 28.

As shown in FIGS. 4 and 5, the circular locking member 25 includes a toothed ring 36, a raised square aperture 32 disposed at the center thereof, an engaging member 39 having a second projecting portion 41 for easily engaging with the toothed ring 36, a supporting member 40 having a second projecting portions for supporting the engaging member 39, a V-shaped first spring 37 based on the first projecting member 42 and connected to both raised square aperture 32 and second projecting portion 41, and a V-shaped second spring 38 based on the second projecting portion 41 and connected to both first projecting portion 42 and an end of the engaging member 39 for tightly locking the engaging member 39 with the toothed ring 36.

As shown in FIGS. 4 and 7, the circular plate 26 includes a large aperture 43, a square aperture disposed at the center thereof for receiving the square end 34 of the rod 28, and a pair of apertures 44. The cover 27 includes a screwed aperture 35 disposed at the center thereof for receiving the screw 29, a stopper 45 engaged through the large aperture 43 for stopping the engaging member 39 to engage into the toothed ring 36 and a pin 46 for selectively engaging one of the pair of apertures 44 so as to lock or release the jaw-adjusting member 23. The rod 28 has a circular end 33 for insertion into an aperture 14 of the raised jaw 14 (FIG. 7).

As shown in FIG. 8, the C-shaped jaw 13 is provided with an elliptical aperture 47 having a toothed side 48 at extending end for receiving and gearing with the toothed wheel 31 so as to be moved forward and backward by rotating the handle body 24, and a plurality of ridges 49 disposed in the inside of the C-shaped jaw 13 for tightly gripping any size armored electric cable In operation, as shown in FIG. 3, when the jaw-adjusting member 23 is rotated by the user in the clockwise direction, in the direction indicated by arrow (a), the C-shaped jaw 13 moves forward in the direction indicated by arrow (A) for enlarging a gripping area so as to accommodate any size armored electric cable 19. Therefore, any size armored electric cable 19 may be easily engaged in the gripping area (FIG. 1). Thereafter, as shown in FIG. 6, the jaw-adjusting member 23 is rotated by the user in a counter clockwise direction, in the direction indicated by arrow (b), the C-shaped jaw 13 moves forward in the direction indicated by arrow (b), the C-shaped jaw 13 moves forward in the direction indicated by arrow (B) for narrowing the gripping area so as to tightly grip the armored electric cable 19 (FIG. 2).

At that time, when the user squeezes the handles 12 of other gripping body 10 and cutting body 12, the cutting point 15, of the cutting edge 15 extended therefrom vertically cuts the metal sheath 20 of the armored electric cable 19 (FIG. 2). Accordingly, the metal sheath 20 is separated form the armored electrical cable 19. Thereafter, the insulation skins 21 is readily stripped by utilizing the plurality of stripper notches 18 of the stripping and cutting body 17. Thereafter, the electric wires 22 are easily cut by utilizing the blades 17 of the stripping and cutting body 17. Thus, the C-shaped jaw 13 can be easily moved forward and backward, if necessary, for tightly gripping any size of the armed electric cable 19. Furthermore, the plurality of ridges 49 can be powerfully forced to grip the armored electric cable 19 therethrough. Also, after cutting the armored electric cable 19 as one shot, in sequence, the cable 19 can be stripped and catted. Accordingly, when the user carries the tool according to the present invention, the user can operate the armored electric cable without any other tools such as a stripper, a wire cutter and the like.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A tool for cutting and stripping armored electric cables which comprises:
   a gripping body having a C-shaped jaw and a raised jaw disposed at one end thereof,
   a cutting body pivotably connected to said gripping body through a pivot pin, said cutting body having a cutting edge extended to a cutting point for cutting a metal sheath of the armored electric cable,
   a jaw-adjusting member operatively associated with said gripping body and said cutting body for enlarging or narrowing a gripping area so as to receive any size armored electric cable and for tightly gripping the armored electric cable when it is cut, said jaw-adjusting member including:
   a hollow handle body having a conical configuration,
   a tooth wheel connected to said handle body, said tooth wheel having a threaded surface and an aperture disposed therein,
   a rod member operatively engaged with said aperture, said rod member being provided with internal threads,
   a circular locking member disposed within said hollow handle body,
   a circular plate stacked on said circular locking member,
   a circular cover stacked on said circular plate, and a screw member having a screw engagement for aligning the tooth wheel, the handle body, the circular locking member, the circular plate, and the circular cover by extending through said elements into said screw engagement of the screw member with said internal threads of the rod member, and a stripping and cutting member attached to the inside of the middle portion of both said gripping member and said cutting member for stripping insulation and cutting the electric wire within the armored electric cable.

2. The tool of claim 1, wherein the gripping member and the cutting member are provided with a handle, respectively for squeezing the handles so as to cut a metal sheath of the armored electric cable.

3. The tool of claim 1, wherein the C-shaped jaw includes a plurality of ridges disposed in the inside thereof for tightly gripping the armored electric cable therein.

4. The tool of claim 1, wherein the stripping and cutting member is provided with a plurality of pairs of stripper notches for stripping the insulation skin and a pair of blades for cutting the electric wire.

5. The tool of claim 1, wherein the rod contains a circular rod for engaging with an aperture of the raised jaw, and a square hollow end for inserting into square apertures of the toothed wheel, tracking member, and the circular plate, and for receiving the screw.

6. The tool of claim 1, wherein the handle body is provided with a plurality of threaded lines disposed on the surface thereof for easily rotating it.

7. The tool of claim 1, wherein the locking member contains a toothed ring, an engaging member for engaging with said toothed ring, a supporting member for supporting said engaging member, springs for biasing the engaging member with the supporting member.

8. The tool of claim 1, wherein the circular plate contains a large aperture and a pair of apertures disposed thereon.

9. The tool of claim 1, wherein the circular cover contains, a center aperture for receiving the screw, a stopper for stopping the engaging member and a pin for selectively inserting into the pair of apertures of the circular plate.

* * * * *

UNITED STATES PATENT AND TRADEMARK OFFICE
CERTIFICATE OF CORRECTION

PATENT NO.   : 4,932,124
DATED        : June 12, 1990
INVENTOR(S)  : Tai Young PYUN It is certified that error appears in the above-identified patent and that said Letters Patent is hereby corrected as shown below:

In category "[21] Appl. No.", please change "357,165" to --357,166--.

Signed and Sealed this

First Day of October, 1991

Attest:

HARRY F. MANBECK, JR.

*Attesting Officer*

*Commissioner of Patents and Trademarks*